(12) United States Patent
Kroeger et al.

(10) Patent No.: US 10,989,116 B2
(45) Date of Patent: Apr. 27, 2021

(54) INLET ANTI-ICE DOUBLE WALLED DUCT WITH SUPPLY LINE SEAL

(71) Applicant: ROHR, INC., Chula Vista, CA (US)

(72) Inventors: Daniel Kroeger, San Diego, CA (US); Bahram B. Graily, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 177 days.

(21) Appl. No.: 16/292,704

(22) Filed: Mar. 5, 2019

(65) Prior Publication Data

US 2020/0284191 A1 Sep. 10, 2020

(51) Int. Cl.
*F02C 7/047* (2006.01)
*F02C 7/28* (2006.01)

(52) U.S. Cl.
CPC .............. *F02C 7/047* (2013.01); *F02C 7/28* (2013.01); *F05D 2220/323* (2013.01); *F05D 2240/55* (2013.01)

(58) Field of Classification Search
CPC .................................. F02C 7/047; F02C 7/28
See application file for complete search history.

(56) References Cited

U.S. PATENT DOCUMENTS

| 4,674,714 | A |  | 6/1987 | Cole et al. |  |
|---|---|---|---|---|---|
| 5,400,984 | A | * | 3/1995 | Arnold | B64D 15/04 244/134 B |
| 7,900,872 | B2 |  | 3/2011 | Sternberger |  |
| 8,047,470 | B2 |  | 11/2011 | Porte |  |
| 8,308,110 | B2 |  | 11/2012 | Porte |  |
| 8,777,164 | B2 |  | 7/2014 | Vauchel et al. |  |
| 8,800,258 | B2 |  | 8/2014 | Vauchel et al. |  |
| 2002/0179773 | A1 | * | 12/2002 | Breer | B64D 15/04 244/134 R |
| 2008/0149771 | A1 | * | 6/2008 | Zanarelli | F02C 7/047 244/134 R |
| 2010/0242428 | A1 |  | 9/2010 | Vauchel et al. |  |
| 2014/0263837 | A1 |  | 9/2014 | Sternberger |  |
| 2016/0040810 | A1 |  | 2/2016 | Winkler |  |

FOREIGN PATENT DOCUMENTS

| CN | 206647173 | 11/2017 |
|---|---|---|
| EP | 1318283 | 6/2003 |
| RU | 177304 | 2/2018 |

OTHER PUBLICATIONS

European Patent Office, European Search Report dated Apr. 6, 2020 in Application No. 19216541.3.

* cited by examiner

*Primary Examiner* — Steven M Sutherland
(74) *Attorney, Agent, or Firm* — Snell & Wilmer L.L.P.

(57) ABSTRACT

An anti-icing system is disclosed. In various embodiments, the anti-icing system includes an inner duct having a forward end configured to deliver a heated gas to a plenum and an aft end spaced from the forward end; an outer duct circumferentially encompassing at least a portion of the inner duct; and a forward seal system disposed proximate the forward end, the forward seal system including an aft attachment flange configured for positioning adjacent an aft bulkhead face of a forward bulkhead, the inner duct and the outer duct being connected to the aft attachment flange, and a seal configured for positioning adjacent a forward flange face of the aft attachment flange.

20 Claims, 4 Drawing Sheets

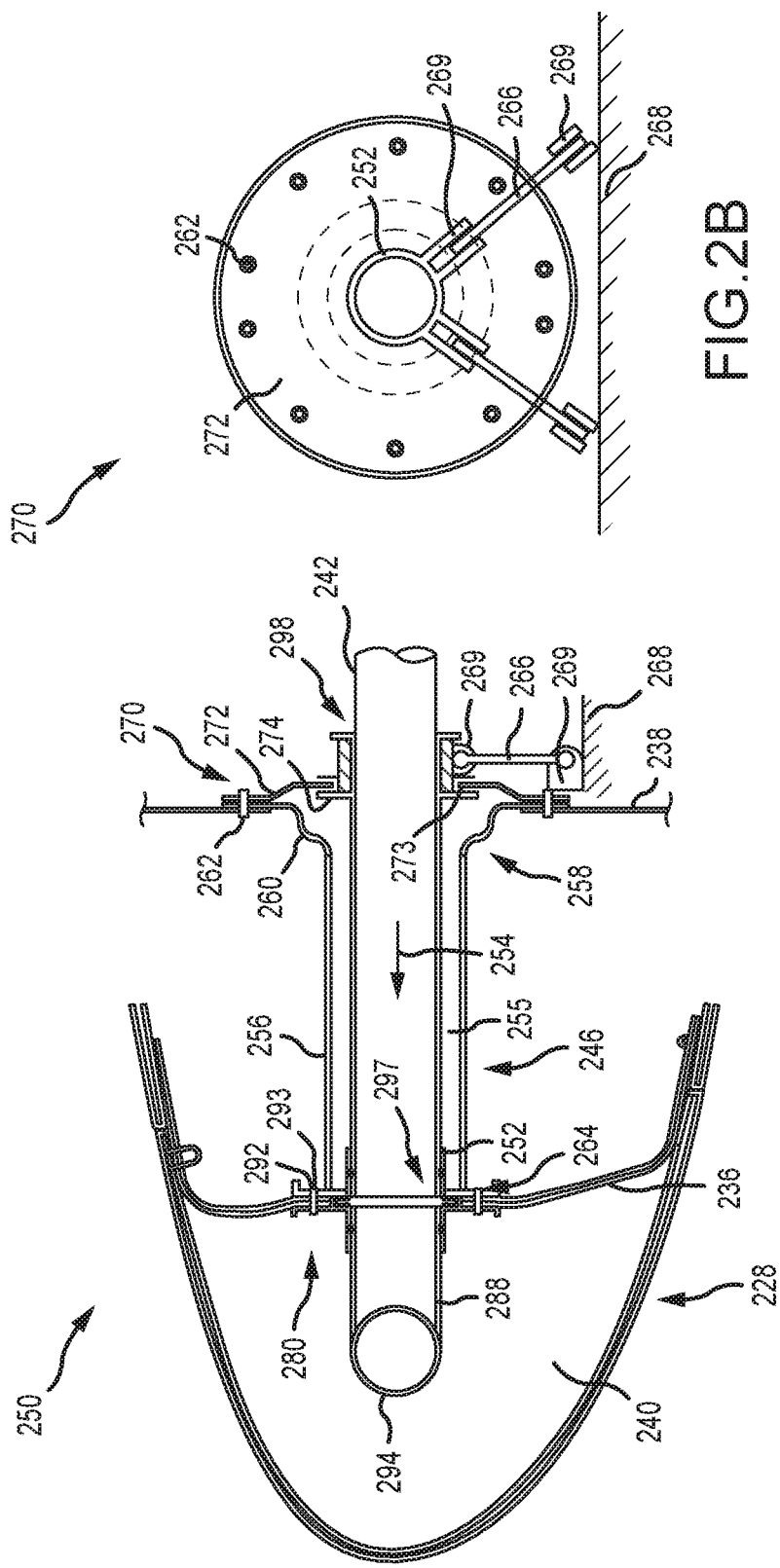

INLET ANTI-ICE DOUBLE WALLED DUCT WITH SUPPLY LINE SEAL

FIELD

The present disclosure relates to gas turbine engines and, more particularly, to anti-ice systems used in aircraft nacelles that surround gas turbine engines.

BACKGROUND

During flight, ice may form and accrete on various aerodynamic surfaces of an aircraft, including, for example, the leading edge surfaces of the wings and the inlet surfaces of nacelles surrounding the gas turbine engines. Formation and accretion of ice on aerodynamic surfaces may adversely affect performance of the aircraft by altering the shape of such surfaces, such as, for example, the wings, the stabilizers and the rudder. Further, formation and accretion of ice on the inlet surfaces of the nacelles may lead to eventual detachment of the ice, which may then be drawn through the engine, resulting in the potential for damage to the engine.

To address the above concerns, aircraft may include anti-icing systems to prevent ice formation and accretion on, or to remove accreted ice from, aircraft surfaces. One method of implementing such anti-icing systems is to direct heated gases from the gas turbine engines (e.g., heated air bled from a compressor section) to interior or exterior surfaces of the aircraft, thereby increasing the temperature of the targeted surfaces. These anti-icing systems may use a double duct configuration to transmit the heated gases from the gas turbine engine to the targeted aircraft surfaces, thereby minimizing the risk of damage to aircraft components (e.g., damage to the acoustic composite structures defining the inner walls of a nacelle inlet) as a result of a ruptured duct. Due to the occurrence of thermal expansion and vibration within and surrounding such double duct configurations, seal systems are used, for example, to exhaust the heated gases in the event of a ruptured duct and to prevent other fluids (e.g., fuel, hydraulic fluid and water) from entering the double duct configuration. The seal systems may be employed, for example, at the intersections of the forward and the aft bulkheads of a nacelle inlet and the double duct configurations extending therethrough.

SUMMARY

An anti-icing system is disclosed. In various embodiments, the anti-icing system includes an inner duct having a forward end configured to deliver a heated gas to a plenum and an aft end spaced from the forward end; an outer duct circumferentially encompassing at least a portion of the inner duct; and a forward seal system disposed proximate the forward end, the forward seal system including an aft attachment flange configured for positioning adjacent an aft bulkhead face of a forward bulkhead, the inner duct and the outer duct being connected to the aft attachment flange, and a seal configured for positioning adjacent a forward flange face of the aft attachment flange.

In various embodiments, the system includes a forward attachment flange configured for positioning adjacent a forward bulkhead face of the forward bulkhead. In various embodiments, an annular flange extends axially from at least one of the forward flange face of the aft attachment flange and an aft flange face of the forward attachment flange, the annular flange configured to surround the seal. In various embodiments, the forward seal system is configured to prevent the heated gas in the plenum from entering a volume defined by the inner duct and the outer duct.

In various embodiments, the system further includes a plenum duct connected to a forward attachment flange configured for positioning adjacent a forward bulkhead face of the forward bulkhead. In various embodiments, the plenum duct includes a first end configured for connection to the forward attachment flange and a second end configured for connection to a piccolo tube system or a nozzle assembly. In various embodiments, the forward attachment flange and the aft attachment flange are configured for engagement with one another by a removable fastener extending through the aft attachment flange and the forward bulkhead and into the forward attachment flange.

In various embodiments, the system includes an aft seal system disposed proximate the aft end. In various embodiments, the outer duct is connected to the aft attachment flange and to an aft bulkhead to form a volume between the inner duct and the outer duct and the forward bulkhead and the aft bulkhead. In various embodiments, a bellows is configured to connect the outer duct to the aft bulkhead.

A seal assembly for an anti-icing system is disclosed. In various embodiments, the seal assembly includes a forward attachment flange configured for positioning adjacent a forward bulkhead face of a forward bulkhead; an aft attachment flange configured for positioning adjacent an aft bulkhead face of the forward bulkhead and configured for connection to an inner duct and an outer duct; and a seal configured for positioning between a forward flange face of the aft attachment flange and an aft flange face of the forward attachment flange.

In various embodiments, an annular flange extends axially from at least one of the forward flange face of the aft attachment flange and the aft flange face of the forward attachment flange. In various embodiments, the forward attachment flange and the aft attachment flange are configured for engagement with one another by a fastener extending through the forward bulkhead. In various embodiments, the fastener is a bolt having a threaded end configured to engage a threaded aperture positioned within or through the forward attachment flange. In various embodiments, the forward attachment flange is configured for connection to a forward plenum duct.

A gas turbine engine is disclosed. In various embodiments, the gas turbine engine includes a nacelle having a forward plenum defined by an inlet surface and a forward bulkhead; a compressor section; a conduit configured to deliver a heated gas bled from the compressor section to the forward plenum; and an anti-icing system, which includes an inner duct having a first end configured to deliver the heated gas to the forward plenum and a second end configured to receive the heated gas from the conduit; an outer duct circumferentially encompassing the inner duct between the forward bulkhead and an aft bulkhead; and a forward seal system disposed proximate the forward bulkhead, the forward seal system including an aft attachment flange configured for positioning adjacent an aft bulkhead face of the forward bulkhead, the inner duct and the outer duct being connected to the aft attachment flange, and a seal configured for positioning adjacent a forward flange face of the aft attachment flange.

In various embodiments, a forward attachment flange is configured for positioning adjacent a forward bulkhead face of the forward bulkhead. In various embodiments, an annular flange extends axially from at least one of the forward flange face of the aft attachment flange and an aft flange face of the forward attachment flange, the annular flange configured to surround the seal. In various embodiments, an aft seal system is disposed proximate the second end. In various embodiments, the outer duct is connected to the aft attachment flange and to the aft bulkhead to form a volume between the inner duct and the outer duct and the forward bulkhead and the aft bulkhead.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B, 2C and 2D illustrate various side, sectional and axial views of an anti-icing system, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
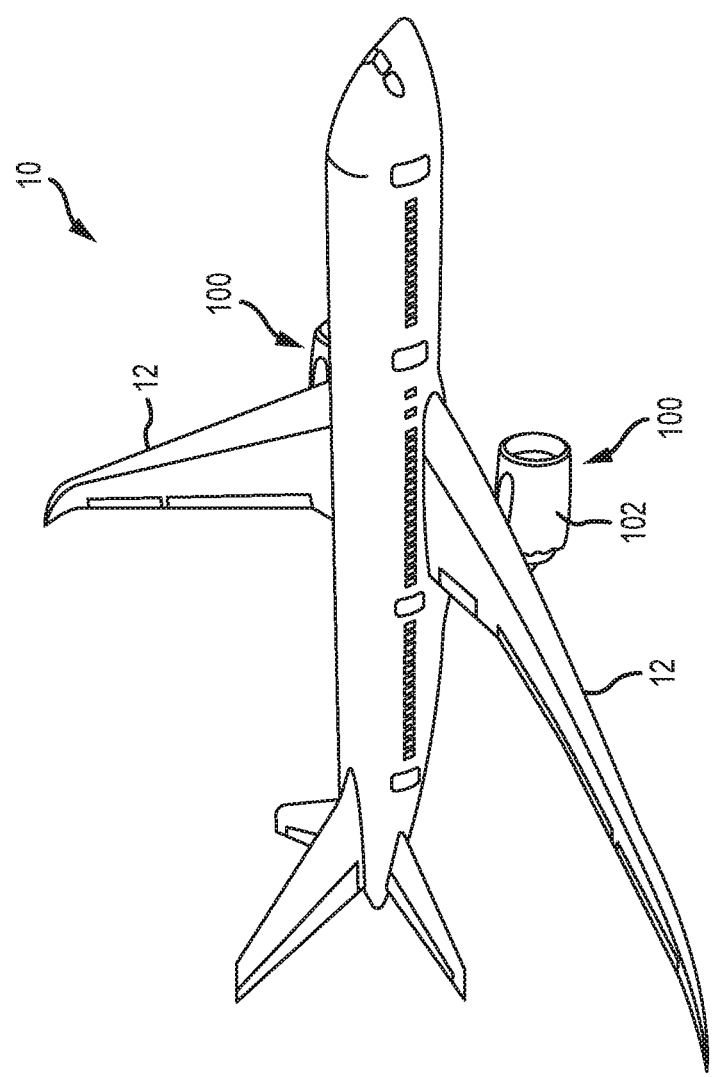
FIG. 1A is a perspective view of an aircraft having a gas turbine engine, in accordance with various embodiments.
Figure 1B:
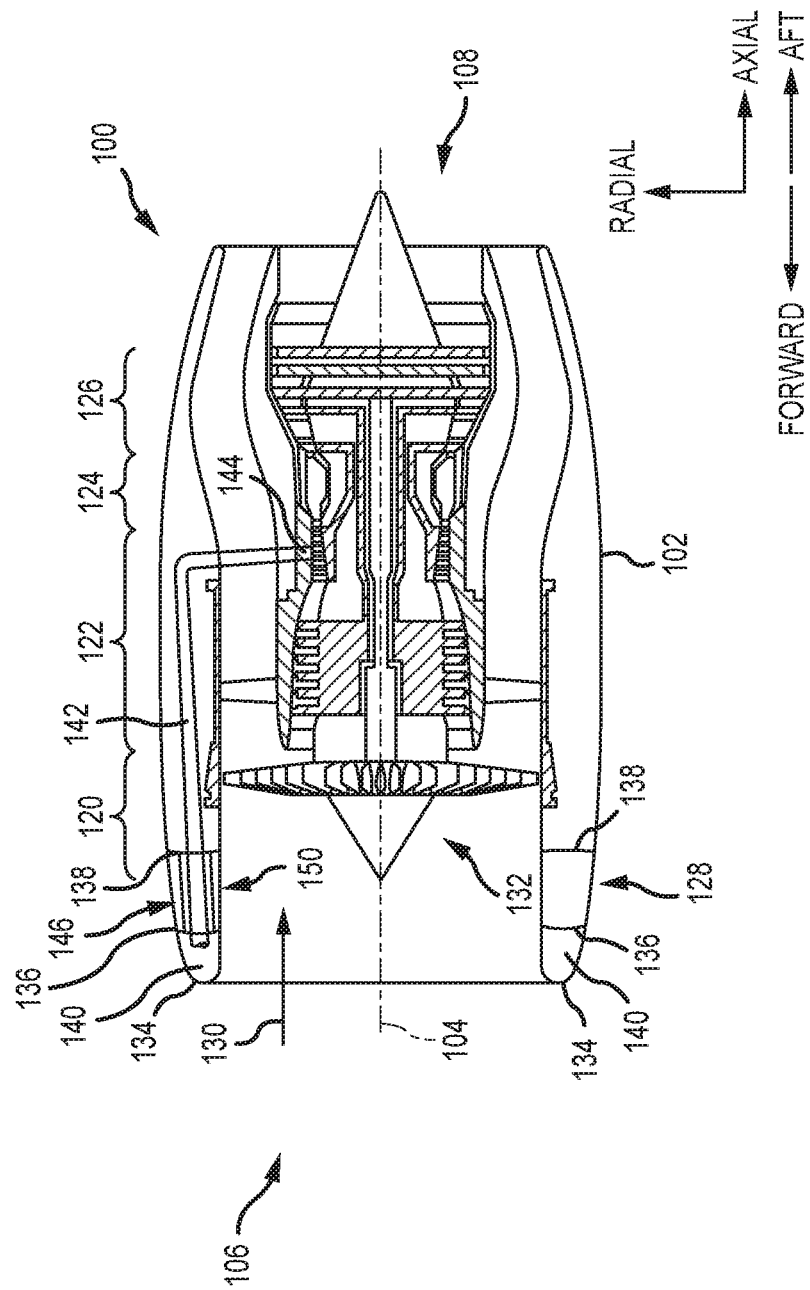
FIG. 1B is a side, cross sectional view of a gas turbine engine, in accordance with various embodiments.

Referring to FIGS. 1A and 1B, an aircraft 10 includes a gas turbine engine 100 mounted to, for example, a wing 12 of the aircraft 10. The gas turbine engine 100 includes a nacelle 102 defining a housing that surrounds the gas turbine engine 100 about a longitudinal axis 104. The longitudinal axis 104 extends through the center of the gas turbine engine 100 between a forward end 106 and an aft end 108 of the gas turbine engine 100. The gas turbine engine 100 generally includes a fan section 120, a compressor section 122, a combustor section 124 and a turbine section 126. The nacelle 102 includes an inlet surface 128 for directing an air flow 130 toward the fan section 120 and through an inlet section 132. Because the inlet surface 128 is located at the forward end 106, and therefore not heated directly by the gas turbine engine 100, the inlet surface 128 is prone to the accumulation of ice, especially along a forward lip surface 134 (i.e., the leading edge of the nacelle 102).

In various embodiments, the nacelle 102 includes a forward bulkhead 136 and an aft bulkhead 138, both of which are annularly or near-annularly arranged about the longitudinal axis 104. The inlet surface 128 and the forward bulkhead 136 define a forward plenum 140 for a heated gas to flow and perform the anti-icing function by heating various surfaces, such as, for example, the forward lip surface 134. In various embodiments, the heated gas is directed to the forward plenum 140 via a conduit 142 configured to transport the heated gas from bled from the compressor section 122. The conduit 142 extends from a tap 144 at the compressor section 122 and extends to a duct system 146 that extends from the aft bulkhead 138 to the forward bulkhead 136. In various embodiments, as described further below, the duct system 146 may comprise a double-walled duct. In various embodiments, an anti-icing system 150 is configured to deliver the heated gas (e.g., hot air bled from the compressor section 122 of the gas turbine engine 100) to the forward plenum 140 to prevent the formation of ice on the forward lip surface 134.

Figures 2C, 2D:
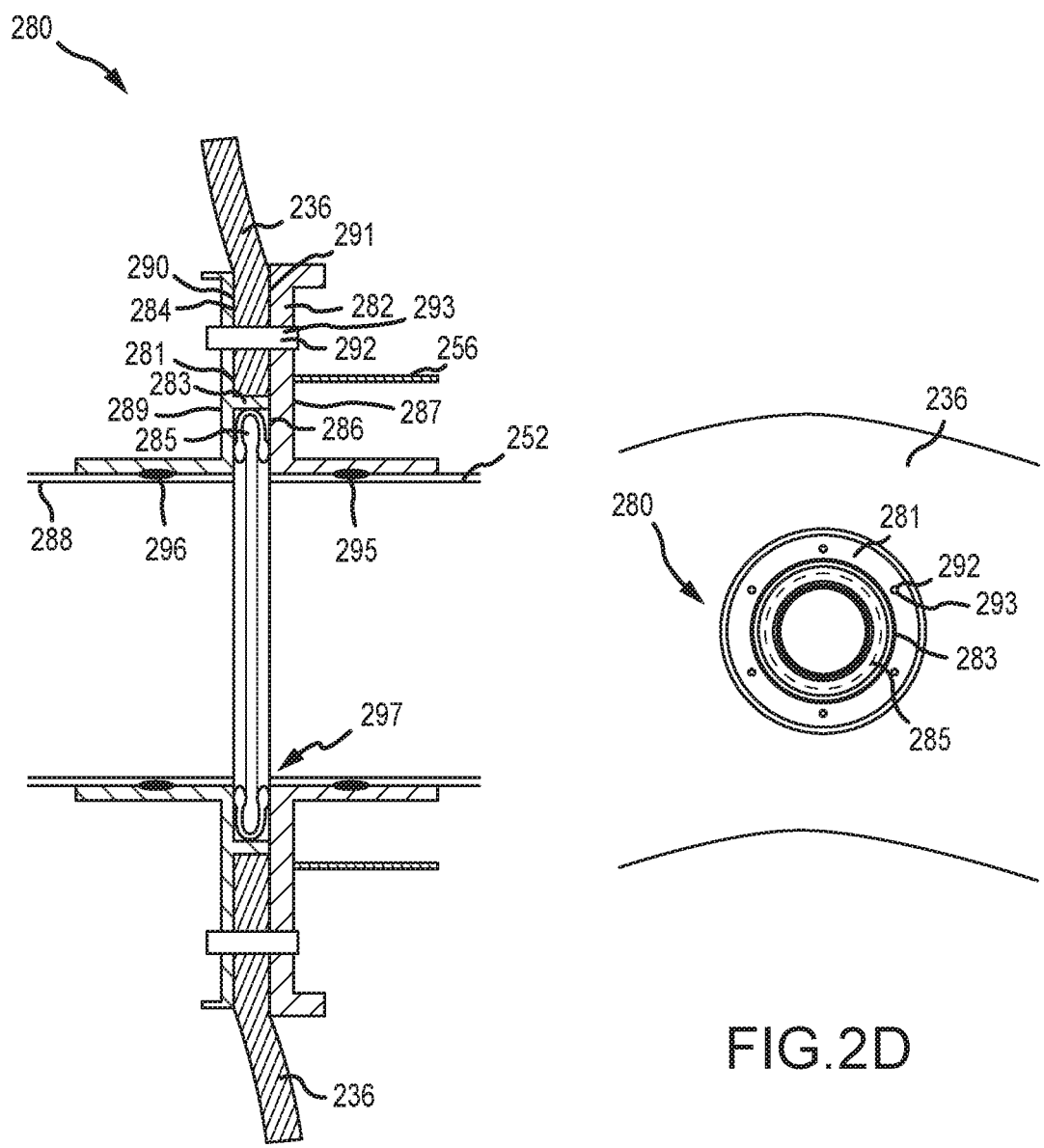

Referring now to FIGS. 2A-2D, an anti-icing system 250, such as, for example, the anti-icing system 150 described above with reference to FIG. 1B, is illustrated. More specifically, and as shown in FIG. 2A, the anti-icing system 250 includes a duct system 246 having an inner duct 252 configured to deliver a heated gas 254 from a compressor section, such as, for example, the compressor section 122 described above with reference to FIG. 1B, to a forward plenum 240. Similar to the description above, the forward plenum 240 is defined by an inlet surface 228 and a forward bulkhead 236 (or a first bulkhead). The inner duct 252 extends from the compressor section via a conduit 242 and between the forward bulkhead 236 and an aft bulkhead 238 (or a second bulkhead). In various embodiments, the inner duct 252 may be characterized as having a forward end 297 proximate the forward bulkhead 236 and an aft end 298 proximate the aft bulkhead 238.

The anti-icing system 250 further includes an outer duct 256 that circumferentially encompasses at least a portion of the inner duct 252. For example, the outer duct 256 may encompass the length of the inner duct 252 between the forward bulkhead 236 and the aft bulkhead 238. This configuration allows the outer duct 256 to contain the heated gas 254 from the compressor section as a result of a rupture occurring within the inner duct 252. The configuration further allows the inner duct 252 to continue directing the heated gas 254 to the forward plenum 240 notwithstanding the rupture occurring within the inner duct 252. In various embodiments, the outer duct 256 may be substantially parallel to the inner duct 252 along the length of the inner duct 252 encompassed by the outer duct 256, with a volume 255 (or void) being defined between the surfaces of the inner duct 252 and the outer duct 256.

In various embodiments, a first end 258 of the outer duct 256 is mounted to the aft bulkhead 238 by a bellows 260. The bellows 260 forms an annular seal between the aft bulkhead 238 and the outer duct 256. In various embodiments, the bellows 260 may be welded to one or both of the aft bulkhead 238 and the outer duct 256 about the circumference of the bellows 260. The bellows 260 may also be secured to one or both of the aft bulkhead 238 and the outer duct 256 using a plurality of rivets 262 or the like disposed about a radially outer circumference of the bellows 260. The bellows 260 may be configured to accommodate vibration, lateral deflection, and thermal expansion and contraction of the outer duct 256 and one or both of the forward bulkhead 236 and the aft bulkhead 238. In various embodiments, the bellows 260 may be constructed of an austenitic nickel-chromium-based-alloy, titanium, or any other material suitable for high-temperature or high-pressure applications. As described further below, a second end 264 of the outer duct 256 is mounted to the forward bulkhead 236. In such a configuration, the inner duct 252, the outer duct 256, the bellows 260, the forward bulkhead 236 and the aft bulkhead 238 may further define the volume 255.

Referring now to FIGS. 2A and 2B, in various embodiments, the anti-icing system 250 includes a link 266 (or a plurality of links) configured to support the inner duct 252 proximate the aft bulkhead 238. The link 266 is configured to couple the inner duct 252 to a fixed structure 268 of the gas turbine engine. The fixed structure 268 may comprise, for example, an attachment ring extending circumferentially about the gas turbine engine. For example, the link 266 may be mounted between the inner duct 252 and the fixed structure 268 using mounts 269 disposed on an aft side of the aft bulkhead 238. The mounts 269 securing the link 266 to the fixed structure 268 and the inner duct 252 may be oriented in any suitable direction (e.g., axially, radially, etc.). The mounts 269 may be configured to permit relative motion between the inner duct 252 and the fixed structure 268. The link 266 may be employed with any number of additional links (e.g., 1, 2, 3, or more) necessary to support the inner duct 252.

The link 266 may support or allow movement of the inner duct 252 in one or more of a radial, lateral, or axial direction. Such movement may facilitate leakage of fluids from locations aft of the aft bulkhead to enter a volume 255 between the inner duct 252 and the outer duct 256. Such movement may also facilitate leakage between the forward plenum 240 to locations aft of the forward bulkhead 236. Accordingly, an aft seal system 270 and a forward seal system 280 are incorporated into the anti-icing system 250. In various embodiments, the aft seal system 270 is multi-functional in that it allows the heated gas 254 to escape the volume 255 between the inner duct 252 and the outer duct 256 in the event of a rupture occurring within the inner duct 252 and it also prevents the flow of fluids—e.g., fuel, hydraulic fluid or water—from entering the volume 255 between the inner duct 252 and the outer duct 256 from locations aft of the aft bulkhead 238. In various embodiments, the aft seal system 270 is disposed aft of the aft bulkhead 238 and comprises an aft seal 272 (e.g., a labyrinth seal) configured to contact a flange 274 (or be disposed in close proximity to the flange 274) that is affixed to the inner duct 252.

Referring now to FIGS. 2A, 2C and 2D, the anti-icing system 250 includes the forward seal system 280, configured to provide a barrier to heated gas flowing in the forward plenum 240 from entering the volume 255 between the inner duct 252 and the outer duct 256 or otherwise passing through the forward bulkhead 236 to volumes or spaces aft thereof. In various embodiments, the forward seal system 280 includes a forward attachment flange 281 configured for positioning forward of the forward bulkhead 236 and an aft attachment flange 282 configured for positioning aft of the forward bulkhead 236. In various embodiments, the forward attachment flange 281 includes an annular flange 283 extending axially from an aft face 284 of the forward attachment flange 281. In various embodiments, the annular flange 283 is annular or substantially annular in shape and configured to surround a forward seal 285 that is also substantially annular. So configured, when assembled, the forward seal 285 is surrounded by the aft face 284 of the forward attachment flange 281, a forward face 286 of the aft attachment flange 282 and a radially inner face of the annular flange 283. While the disclosure describes the forward seal system 280 as having the annular flange 283 extending from the aft face 284 of the forward attachment flange 281, the disclosure contemplates the annular flange 283, instead, extending from the forward face 286 of the aft attachment flange 282 or, in various embodiments, from both the aft face 284 of the forward attachment flange 281 and the forward face 286 of the aft attachment flange 282, the result of various embodiments being to surround the forward seal 285.

In various embodiments, the inner duct 252 and the outer duct 256 are connected to the aft attachment flange 282. For example, forward facing ends of the inner duct 252 and the outer duct 256 may be welded to an aft face 287 of the aft attachment flange 282. A radially outer surface of the forward end of the inner duct 252 may, in various embodiments, be secured by a first weld 295 to a radially inner surface of the aft attachment flange 282 (as illustrated in FIG. 2C). Similarly, in various embodiments, a forward plenum duct 288 is connected to the forward attachment flange 281. For example, an aft facing end of the forward plenum duct 288 may be welded to a forward face 289 of the forward attachment flange 281. A radially outer surface of the aft end of the forward plenum duct 288 may, in various embodiments, be secured by a second weld 296 to a radially inner surface of the forward attachment flange 281 (as illustrated in FIG. 2C). A forward end of the forward plenum duct 288 may likewise be connected to an appropriate delivery system for the heated gas to be distributed throughout the forward plenum 240. For example, the forward end of the forward plenum duct 288 may be welded or otherwise connected to a piccolo tube 294 that extends circumferentially about the forward plenum 240. In various embodiments, the piccolo tube 294 may be a component of a piccolo tube system. In various embodiments, a nozzle system may, together with or separately from the piccolo tube 294 or piccolo system, be employed to distribute the heated gas throughout the forward plenum 240.

In accordance with the foregoing, the forward seal system 280 may be assembled as follows. First, the aft face 284 of the forward attachment flange 281 (which may be connected to the piccolo tube 294) is positioned against a forward face 290 of the forward bulkhead 236. Second, the forward seal 285 is positioned against the aft face 284 of the forward attachment flange 281 and within a circular cavity formed by the annular flange 283. Third, the forward face 286 of the aft attachment flange 282 (which may be connected to the inner duct 252 and the outer duct 256) is positioned against an aft face 291 of the forward bulkhead 236, such that the forward seal 285 is surrounded by the aft face 284 of the forward attachment flange 281, the forward face 286 of the aft attachment flange 282 and the annular flange 283. The forward attachment flange 281 and the aft attachment flange 282 may then be secured together using, for example, a plurality of fasteners 292. In various embodiments, each of the plurality of fasteners 292 is configured for insertion through the aft attachment flange 282 and further configured to then engage the forward attachment flange 281, securing the same to the aft attachment flange 282. In various embodiments, the plurality of fasteners 292 may comprise a plurality of bolts 293, each having a threaded end configured to engage a corresponding threaded aperture extending into or through the forward attachment flange 281. In various embodiments, one or more of the plurality of fasteners 292 comprises a removable fastener, allowing the forward seal system 280 to be disassembled and removed from the anti-icing system 250 for inspection, repair or replacement.

Following assembly of the forward seal system 280, the aft seal system 270 may be similarly assembled to the aft bulkhead 238 and the link 266 assembled to couple the inner duct 252 to the fixed structure 268 of the gas turbine engine. The assembly above described enables the anti-icing system 250 to be assembled and disassembled for repair or replacement. For example, in various embodiments, the aft seal system 270 may be disassembled, followed by removal of the aft attachment flange 282 of the forward seal system 280, thereby exposing the forward seal 285 for removal and replacement. In various embodiments, the forward seal 285 may comprise standard seals, such as, for example, E-seals or Omega seals, either of which may be obtained from JetSeal, Inc. (www.jetseal.com), located in Spokane Valley, Wash., USA. The forward seal system 280 above described also provides a fixed attachment of the inner duct 252 to the forward bulkhead 236, thereby forcing any thermal expansion of the inner duct 252 in the axial direction toward the aft seal system 270, which is configured to accommodate such expansion in the aft direction. In addition, the forward seal system 280 above described may provide a standardized forward seal system, similar to an industry standard AS1895 interface, that may be employed across various models of gas turbine engines and anti-ice systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An anti-icing system, comprising:
   an inner duct having a forward end configured to deliver a heated gas to a plenum and an aft end spaced from the forward end;
   an outer duct circumferentially encompassing at least a portion of the inner duct; and
   a forward seal system disposed proximate the forward end, the forward seal system including
      an aft attachment flange configured for positioning adjacent an aft bulkhead face of a forward bulkhead, the inner duct being connected to the aft attachment flange and the outer duct being connected to an aft flange face of the aft attachment flange, and
      a seal configured for positioning adjacent a forward flange face of the aft attachment flange.

2. The anti-icing system of claim 1, further comprising a forward attachment flange configured for positioning adjacent a forward bulkhead face of the forward bulkhead.

3. The anti-icing system of claim 2, further comprising an annular flange extending axially from at least one of the forward flange face of the aft attachment flange and an aft flange face of the forward attachment flange, the annular flange configured to surround the seal.

4. The anti-icing system of claim 3, wherein the forward seal system is configured to prevent the heated gas in the plenum from entering a volume defined by the inner duct and the outer duct.

5. The anti-icing system of claim 1, further comprising a plenum duct connected to a forward attachment flange configured for positioning adjacent a forward bulkhead face of the forward bulkhead.

6. The anti-icing system of claim 5, wherein the plenum duct includes a first end configured for connection to the forward attachment flange and a second end configured for connection to a piccolo tube system or a nozzle assembly.

7. The anti-icing system of claim 6, wherein the forward attachment flange and the aft attachment flange are configured for engagement with one another by a removable fastener extending through the aft attachment flange and the forward bulkhead and into the forward attachment flange.

8. The anti-icing system of claim 1, further comprising an aft seal system disposed proximate the aft end.

9. The anti-icing system of claim 8, wherein the outer duct is connected to the aft attachment flange and to an aft bulkhead to form a volume between the inner duct and the outer duct.

10. The anti-icing system of claim 9, further comprising a bellows configured to connect the outer duct to the aft bulkhead.

11. A seal assembly for an anti-icing system, comprising:
a forward attachment flange configured for positioning adjacent a forward bulkhead face of a forward bulkhead;
an aft attachment flange configured for positioning adjacent an aft bulkhead face of the forward bulkhead and configured for connection to an inner duct and an outer duct, the aft attachment flange including an aft flange face configured for connection to a forward end of the outer duct; and
a seal configured for positioning between a forward flange face of the aft attachment flange and an aft flange face of the forward attachment flange.

12. The seal assembly of claim 11, further comprising an annular flange extending axially from at least one of the forward flange face of the aft attachment flange and the aft flange face of the forward attachment flange.

13. The seal assembly of claim 12, wherein the forward attachment flange and the aft attachment flange are configured for engagement with one another by a fastener extending through the forward bulkhead.

14. The seal assembly of claim 13, wherein the fastener is a bolt having a threaded end configured to engage a threaded aperture positioned within or through the forward attachment flange.

15. The seal assembly of claim 14, wherein the forward attachment flange is configured for connection to a forward plenum duct.

16. A gas turbine engine, comprising:
a nacelle having a forward plenum defined by an inlet surface and a forward bulkhead;
a compressor section;
a conduit configured to deliver a heated gas bled from the compressor section to the forward plenum; and
an anti-icing system, comprising:
an inner duct having a first end configured to deliver the heated gas to the forward plenum and a second end configured to receive the heated gas from the conduit;
an outer duct circumferentially encompassing the inner duct between the forward bulkhead and an aft bulkhead; and
a forward seal system disposed proximate the forward bulkhead, the forward seal system including an aft attachment flange configured for positioning adjacent an aft bulkhead face of the forward bulkhead, the inner duct being connected to the aft attachment flange and the outer duct being connected to an aft flange face of the aft attachment flange, and a seal configured for positioning adjacent a forward flange face of the aft attachment flange.

17. The gas turbine engine of claim 16, wherein the anti-icing system further comprises a forward attachment flange configured for positioning adjacent a forward bulkhead face of the forward bulkhead.

18. The gas turbine engine of claim 17, further comprising an annular flange extending axially from at least one of the forward flange face of the aft attachment flange and an aft flange face of the forward attachment flange, the annular flange configured to surround the seal.

19. The gas turbine engine of claim 16, further comprising an aft seal system disposed proximate the second end.

20. The gas turbine engine of claim 19, wherein the outer duct is connected to the aft attachment flange and to the aft bulkhead to form a volume between the inner duct and the outer duct.

* * * * *